(12) United States Patent
Soga

(10) Patent No.: US 9,688,862 B2
(45) Date of Patent: Jun. 27, 2017

(54) CURABLE RESIN COMPOSITION AND PRIMER COMPOSITION

(71) Applicant: THREE BOND FINE CHEMICAL CO., LTD., Kanagawa (JP)

(72) Inventor: Tetsunori Soga, Kanagawa (JP)

(73) Assignee: THREE BOND FINE CHEMICAL CO., LTD., Sagamihara-shi, Kanagawa (JP)

( * ) Notice: Subject to any disclaimer, the term of this patent is extended or adjusted under 35 U.S.C. 154(b) by 87 days.

(21) Appl. No.: 14/401,451

(22) PCT Filed: May 15, 2013

(86) PCT No.: PCT/JP2013/063591
§ 371 (c)(1),
(2) Date: Nov. 14, 2014

(87) PCT Pub. No.: WO2013/172388
PCT Pub. Date: Nov. 21, 2013

(65) Prior Publication Data
US 2015/0136322 A1    May 21, 2015

(30) Foreign Application Priority Data
May 18, 2012   (JP) .................................. 2012-114513

(51) Int. Cl.
| | | |
|---|---|---|
| *C09J 5/02* | (2006.01) | |
| *C09D 5/00* | (2006.01) | |
| *C09J 123/22* | (2006.01) | |
| *C09D 7/12* | (2006.01) | |
| *B29C 65/48* | (2006.01) | |
| *C09J 123/26* | (2006.01) | |
| *C09J 5/06* | (2006.01) | |
| C08K 5/1515 | (2006.01) | |
| C08K 5/5425 | (2006.01) | |
| B29K 23/00 | (2006.01) | |
| B29L 9/00 | (2006.01) | |

(52) U.S. Cl.
CPC .......... *C09D 5/002* (2013.01); *B29C 65/4835* (2013.01); *C09D 7/125* (2013.01); *C09J 5/06* (2013.01); *C09J 123/22* (2013.01); *C09J 123/26* (2013.01); B29K 2023/18 (2013.01); B29L 2009/00 (2013.01); C08K 5/1515 (2013.01); C08K 5/5425 (2013.01)

(58) Field of Classification Search
CPC .. C09D 5/002; C09D 7/125; C09J 5/02; C09J 123/22; B29C 66/026; C08L 101/00
USPC ................................................ 156/314, 315
See application file for complete search history.

(56) References Cited

U.S. PATENT DOCUMENTS

| | | | | |
|---|---|---|---|---|
| 4,053,682 A | * | 10/1977 | Donermeyer | C09J 177/12 427/388.3 |
| 4,904,732 A | | 2/1990 | Iwahara et al. | |
| 5,164,442 A | * | 11/1992 | Itoh | C08F 283/122 524/492 |
| 5,512,640 A | * | 4/1996 | Osawa | C08G 77/38 525/476 |
| 5,973,067 A | | 10/1999 | Nakamura et al. | |
| 2008/0044149 A1 | * | 2/2008 | Kanno | C08G 59/687 385/123 |
| 2009/0004468 A1 | * | 1/2009 | Chen | C04B 41/009 428/351 |
| 2009/0220794 A1 | | 9/2009 | O'Neill et al. | |

(Continued)

FOREIGN PATENT DOCUMENTS

| | | |
|---|---|---|
| EP | 0044673 | 1/1982 |
| JP | 57-21457 | 2/1982 |

(Continued)

OTHER PUBLICATIONS

Machine translation of JP 2002265868 date unknown.*

(Continued)

*Primary Examiner* — John Goff
(74) *Attorney, Agent, or Firm* — Dickinson Wright PLLC

(57) ABSTRACT

[Problem] Polyphenylenesulfide (PPS), polypropylene (PP), polyethylene (PE), stainless steel (SUS) and the like correspond to hard-to-bond materials, and thus it has been difficult to improve the adhesion to these materials in adhesives and sealants.

[Solution] Provided is a curable resin composition containing:
  component (A), being a thermosetting resin composition; and
  component (B), being an adhesion-imparting agent consisting of a compound represented by the following general formula 1, or, containing the compound represented by the following general formula 1 and a compound represented by the following general formula 2:

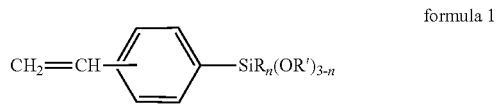

formula 1

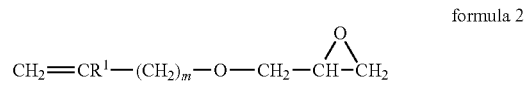
formula 2 wherein in the general formula 1, n represents 0 to 2, R each independently represents an alkyl group having 1 to 10 carbon numbers or a derivative of the alkyl group, R' represents methyl group, ethyl group or propyl group, and in the general formula 2, m represents 1 to 3, and $R^1$ represents hydrogen atom or methyl group.

13 Claims, No Drawings

(56) References Cited

U.S. PATENT DOCUMENTS

2010/0129676 A1 5/2010 Fujimoto et al.
2011/0014483 A1 1/2011 Okazaki

FOREIGN PATENT DOCUMENTS

| | | | | |
|---|---|---|---|---|
| JP | 57040572 A | * | 3/1982 | |
| JP | 63-6041 | | 1/1988 | |
| JP | 9-208923 | | 8/1997 | |
| JP | 2002265868 A | * | 9/2002 | |
| JP | 2005-336269 | | 12/2005 | |
| JP | 2007-254624 | | 10/2007 | |
| JP | 2008-133414 | | 6/2008 | |
| JP | 2008-540771 | | 11/2008 | |
| JP | WO 2010083192 A2 | * | 7/2010 | ........... C08G 59/223 |
| JP | 2012-077107 | | 4/2012 | |
| JP | 2013-018850 | | 1/2013 | |
| WO | 2008/136373 | | 11/2008 | |
| WO | 2009/113485 | | 9/2009 | |

OTHER PUBLICATIONS

Machine translation of JP 57-40572 date unknown.*
International Preliminary Report on Patentability for PCT/JP2013/063591, dated Nov. 27, 2014, and English translation thereof.
International Search Report for PCT/JP2013/063591, dated Aug. 13, 2013, and English translation thereof.

* cited by examiner

CURABLE RESIN COMPOSITION AND PRIMER COMPOSITION

TECHNICAL FIELD

The present invention relates to a curable resin composition and a primer composition having fine adhesion to hard-to-bond materials.

BACKGROUND ART

Use of primer compositions for the cases when an adherend including a hard-to-bond material is bonded, the cases when the curing time of an adhesive is shortened, and the like, has been known since before. In general, a primer is used by applying to a subject to be adhered in advance of an adhesive, or the like, thereby a primer finally improves the adhesive strength and adhesion property of the adhesive. A catalyst and a promoter are incorporated in a primer composition as raw materials that promote the reactions of an adhesive, but since the reaction systems differ depending on respective adhesives, raw materials that are inherent to the respective adhesives are incorporated. Therefore, it is not always true that one kind of primer composition is effective for every adhesives and adherends. Furthermore, there are some cases when the compatibility between an adhesive and a primer composition should also be considered. Specific examples are the case when a primer composition and an adhesive are difficult to be brought into contact and mixed, and the like. Although the full breadth has not been clarified, there are many cases when it cannot be judged whether or not a primer composition and an adhesive can be finely used on a subject unless the primer composition and adhesive are actually used.

Patent Literature 1 describes a primer composition that is suitable for silicone rubbers. Silicone rubbers are thermosetting types since addition-reaction curable types are suitable therefor. Therefore, moisture-curable silicone rubbers which reaction systems are different are not especially described. Curable resins other than silicones are not described even they are of the same addition-reaction curable type. Therefore, it can be said that Patent Literature 1 is not substantially effective for resins other than thermosetting silicone resins. Furthermore, only the initial adhesion force was evaluated, and any reliability test was not verified.

Patent Literature 2 performs reliability tests in water vapor, oils and the like by using thermosetting silicone resins in a similar manner to that of Patent Literature 1. The contents of the reliability tests are a silicone oil immersion test (atmosphere temperature: 200° C.) and a high temperature storage test (atmosphere temperature: 230° C.), and describe that peeling off the adherend is suppressed. However, Patent Literature 2 discloses Examples, as the thermosetting silicone resins of the document, for only silicone resins using organic peroxides as a reaction initiator, and does not include any specific description relating to other adhesives. Since the thermosetting silicone resin of Patent Literature 2 is different from the thermosetting silicone resin using a platinum catalyst described in Cited Reference 1, it can be said that the primer is suitable for a thermosetting silicone resin using an organic peroxide as a reaction initiator.

Patent Literature 3 aims at increasing an adhesion effect between an adhesive and a substrate without limiting the conditions for use of a primer composition. This can be a method that decreases the effect of compatibility due to the combination of a primer composition and an adhesive as possible as mentioned above. Specifically, a primer composition is applied and then plasma is irradiated, and adhesive is finally used. However, the adhesive is a two-component silicone resin, and thus the operation is limited to an addition-reaction type using a catalyst as a reaction system. Furthermore, in the plasma irradiation, it is necessary to preset the present conditions in detail, and the number of the steps increases. Therefore, an advantage that an adhesion effect is easily obtained by use of a primer composition is lost.

CITATION LIST

Patent Literatures

Patent Literature 1: JP 9-208923 A
Patent Literature 2: JP 57-21457 A
Patent Literature 3: JP 2008-540771 W

SUMMARY OF INVENTION

However, besides silicone resins that are deemed as the subjects of the above-mentioned conventional technologies, polyphenylenesulfide (PPS), polypropylene (PP), polyethylene (PE), stainless steel (SUS) and the like correspond to hard-to-bond materials. Therefore, it is difficult to improve the adhesion to these materials by the conventional technologies, and thus it is still difficult to improve the adhesion to these materials in adhesives and sealants.

The present inventors did intensive studies so as to achieve the above-mentioned object, and consequently completed the present invention of a curable resin composition and a primer composition, which have improved adhesion to hard-to-bond materials such as the above-mentioned polyphenylenesulfide.

The summary of the present invention will be explained below. A first aspect of the present invention is a curable resin composition including the following component (A) and component (B). That is, the curable resin composition comprising:

component (A), being a thermosetting resin composition; and component (B), being an adhesion-imparting agent consisting of a compound represented by the following general formula 1, or, an adhesion-imparting agent comprising the compound represented by the following general formula 1 and a compound represented by the following general formula 2:

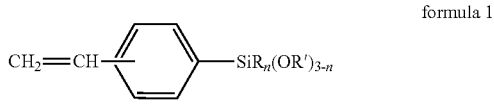

formula 1

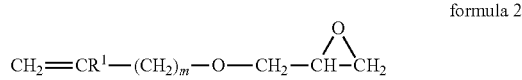

formula 2 wherein in the general formula 1, n represents 0 to 2, R each independently represents an alkyl group having 1 to 10 carbon numbers or a derivative of the alkyl group, R' represents methyl group, ethyl group or propyl group, and in the general formula 2, m represents 1 to 3, and $R^1$ represents hydrogen atom or methyl group.

In addition, a second aspect of the present invention is a primer composition for a thermosetting resin composition, comprising:

component (B), being an adhesion-imparting agent consisting of a compound represented by the following general formula 1, or, an adhesion-imparting agent comprising the compound represented by the following general formula 1 and a compound represented by the following general formula 2:

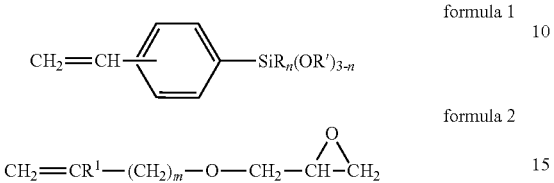

formula 1 formula 2 wherein in the general formula 1, n represents 0 to 2, R each independently represents an alkyl group having 1 to 10 carbon numbers or a derivative of the alkyl group, R' represents methyl group, ethyl group or propyl group, and in the general formula 2, m represents 1 to 3, and $R^1$ represents hydrogen atom or methyl group;

component (C), being a catalyst; and component (D), being a curable film-forming composition.

DESCRIPTION OF EMBODIMENTS

[Curable Resin Composition]

The details of the invention of the curable resin composition of the present invention will be explained below. The curable resin composition essentially contains component (A) of a thermosetting resin composition, and component (B) of an adhesion-imparting agent consisting of a compound represented by the general formula 1 or an adhesion-imparting agent comprising the compound represented by the general formula 1 and a compound represented by the general formula 2. The thermosetting resin composition of the present invention improves the adhesion of polyphenylenesulfide (PPS), polypropylene (PP), polyethylene (PE) and stainless steel (SUS), which correspond to hard-to-bond materials. Especially, the effect of improving adhesion is also exerted even for a curable resin composition having a structure with low polarity such as polyisobutylene skeleton.

Any composition can be used as the thermosetting resin composition of the component (A) as long as it is a one component type and is cured by heating. In view of controlling reactivity, a composition that contains a main agent, a crosslinking agent, a catalyst and a suppressing agent, and is cured by polymerization by an addition reaction (hydrosilation or hydrosilylation) of the main agent and the crosslinking agent by heating, is preferable as the component (A). The suppressing agent as used herein is a compound that suppresses activity of the catalyst. Since storage stability cannot be maintained by a composition containing only a main agent, a crosslinking agent and a catalyst, it is desirable to add the suppressing agent to decrease the activity of the catalyst, thereby, the storage stability is ensured. The thermosetting resin composition as the component (A) has a curing temperature of from 80 to 160° C., preferably from 100 to 150° C. with considering for workability, and has a curing time of preferably from 3 to 90 minutes.

The main agent contained in the thermosetting resin composition of the component (A) is an oligomer having one or more thermal reactive functional group(s) in one molecule. The thermal reactive functional group possessed by the main agent is not especially limited as long as it is a thermal reactive functional group. A preferable thermal reactive functional group is a vinyl group of the following general formula 3 or a vinylsiloxane group of the following general formula 4, and it is preferable to have one or more, preferably two or more thermal reactive functional group(s) in the main agent. Of these, an oligomer having a vinyl group of the general formula 3 is more preferable.

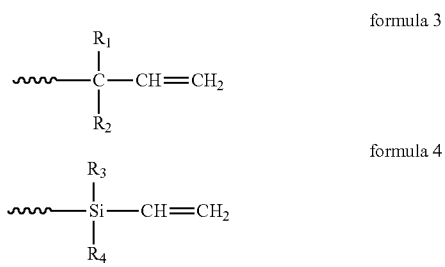

formula 3 formula 4

In the above-mentioned general formula 3, $R_1$ and $R_2$ each independently represent an alkyl group or a derivative of the alkyl group. In the above-mentioned general formula 4, $R_3$ and $R_4$ each independently represent an alkyl group, an aryl group, or a derivative of the alkyl group. In the general formula 3 and the general formula 4, the parts represented by wavy lines represent a polymer chain, and are typically a polyorganosiloxane and a hydrocarbon chain.

The alkyl group has preferably 1 to 10 carbon numbers, more preferably 1 to 3 carbon numbers, and even more preferably 1 carbon number in $R_1$ and $R_2$. Specific examples of the alkyl group include methyl group, ethyl group, propyl group and the like. Examples of the aryl group include aryl groups having preferably 6 to 12 carbon numbers, more preferably 6 carbon numbers. Specific examples include phenyl group. Examples of the derivative of the alkyl group include those having preferably 1 to 10 carbon numbers, more preferably 1 to 3 carbon numbers, and even more preferably 1 carbon number in $R_1$ and $R_2$. Specific examples include alkoxy groups, ether groups and the like.

Examples of the skeleton of the main agent include a dimethylsiloxane skeleton or a polyisobutylene skeleton, a polyisoprene skeleton, a polybutadiene skeleton, hydrogenated types of skeletons having carbon-carbon double bonds among these skeletons, and the like. Hydrogenation is also referred to as hydrogen addition, and means a reduction reaction for adding a hydrogen atom to a compound using hydrogen gas as a reducing agent, and also means converting an unsaturated bond existing in a molecule to saturated bonds. The second exemplary embodiment of the present invention is a curable resin composition wherein the above-mentioned component (A) contains a main agent that is at least one selected from a dimethylsiloxane skeleton, a polyisobutylene skeleton, a polyisoprene skeleton, a polybutadiene skeleton, and a hydrogenated product thereof. As the main agent, an oligomer having a polyisobutylene skeleton is more preferable, and an oligomer having a vinyl group represented by the above-mentioned general formula 3 and a polyisobutylene skeleton is further preferable. In the fields of electric and electronics, the component (A) that does not contain polydimethylsiloxane is preferable, and a polybutadiene skeleton and a hydrogenated polybutadiene skeleton having fine moisture permeability and gas permeability are preferable. Specific examples of the main agent contained in the component (A) include, but are not limited to, Epion series (type A) manufactured by Kaneka Corporation, which are a polyisobutylene having vinyl groups on the both terminals, and the like.

The crosslinking agent contained in the component (A) is a compound having one or more hydrogensiloxane group(s) in one molecule. The hydrogensiloxane group refers to a functional group as shown in the following formula 5. Preferably, the crosslinking agent may be any compound having two or more hydrogensiloxane groups of the formula 5 in one molecule, or may be a modified compound. As the crosslinking agent, a crosslinking agent having compatibility with the main agent is especially preferable. Specific examples of the crosslinking agent contained in the component (A) include poly (dimethylsiloxane-co-methylhydrosiloxane), methylhydrosiloxane-dimethylsiloxane copolymers having trimethylsiloxy terminals, methylhydrogensilicone, and the like. Examples of commercially available products include, but are not limited to, Kaneka Epion CR series CR-300, CR-500 and the like manufactured by Kaneka Corporation, Hydrosiloxanes HMS-013, HMS-151, HMS-301 and the like manufactured by AZmax.co, SH1107 Fluid manufactured by Dow Corning Toray Co., Ltd., and the like.

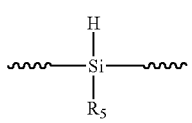

formula 5

In the formula 5, $R_5$ represents an alkyl group, an aryl group, or a derivative of the alkyl group. The parts indicated by a wavy line represent a polymer chain, typically a polyorganosiloxane or a hydrocarbon chain.

As the alkyl group, alkyl groups having 1 to 10 carbon numbers are preferable, and the carbon numbers are more preferably 1 to 5 carbon numbers, even more preferably 1 carbon number. Specific examples of the alkyl group include methyl group, ethyl group, propyl group and the like. As the aryl group, aryl groups having 6 to 12 carbon numbers are preferable, and the carbon numbers are more preferably 6. A specific example is phenyl group. Specific examples include methyl group, ethyl group, propyl group and the like. As the derivative of the alkyl group, those having 1 to 10 carbon numbers are preferable, and the carbon numbers are more preferably 1 to 5, even more preferably 1. Specific examples include an alkoxy group, an ether group and the like.

Specific examples of the catalyst included in the component (A) are not limited as long as they are metal catalysts that are used for an addition reaction of an organopolysiloxane having a vinyl group added to silicon and an organopolysiloxane having hydrogen added to silicon. Especially preferable catalysts are platinum-based and/or rhodium-based catalysts in view of price and large number of kinds. Specific examples include, but are not limited to, zerovalent platinum complexes such as divinyltetramethyl-disiloxane-platinum complex and tetravinyltetramethyltetracyclosiloxane-platinum complex, bivalent platinum complexes such as dichlorobistriphenylphosphine-palladium complex, and tetravalent platinum complexes such as platinum hydrochloride. Specific examples of the rhodium-based catalyst include, but are not limited to, monovalent rhodium complexes such as chlorotristriphenylphosphite-rhodium complex, bivalent rhodium complexes such as tetrakisacetate dirhodium complex, and trivalent rhodium complexes such as trisacetylacetonato-rhodium complex. Alternatively, two or more kinds of catalysts may be mixed and used.

Specific examples of the suppressing agent included in the component (A) include acetylene-based alcohols such as 1-ethynyl-1-cyclohexanol, 2-methyl-3-butyn-2-ol, 3,5-dimethyl-1-hexyn-3-ol and 3-methyl-1-dodecyn-3-ol. Examples of the polymethylvinylcyclosiloxane include 1,3,5,7-tetravinyltetramethyltetracyclosiloxane, divinyltetramethyldisiloxane, tetravinyldimethyldisiloxane, trialkyl cyanurates and the like. Other examples include, but are not limited to, diallyl maleate, dimethyl maleate, diethyl maleate, diallyl fumarate, diethyl fumarate and the like.

In the component (A), the optimal range of the addition amount of the crosslinking agent varies depending on the addition amount of the component (B), but, it is preferable that the crosslinking agent is added with 1 to 20 parts by mass with respect to 100 parts by mass of the main agent. When the crosslinking agent is 1 part by mass or more, curing is performed more certainly, whereas when the crosslinking agent is 20 parts by mass or less, the storage stability of the component (A) is also sufficient. The catalyst is added preferably by 0.001 to 5 parts by mass with respect to 100 parts by mass of the main agent depending on the concentration, and the suppressing agent is added preferably by 0.01 to 5 parts by mass with respect to 100 parts by mass of the main agent. By optimizing the addition amounts of the catalyst and suppressing agent, uncuring and decrease of the storage stability can be suppressed.

The adhesion-imparting agent as the component (B) that can be used in the present invention is an adhesion-imparting agent consisting of a compound having styrene skeleton and a hydrolyzable group represented by the following general formula 1, or an adhesion-imparting agent containing both the compound represented by the following general formula 1 and a glycidyl ether represented by the following general formula 2. This component (B) is added to the component (A). In the case when the adhesion-imparting agent of the component (B) contains both the compound represented by the following general formula 1 and the compound represented by the following general formula 2, the adhesion-imparting agent may be mixed with an adhesion-imparting agent other than these compounds.

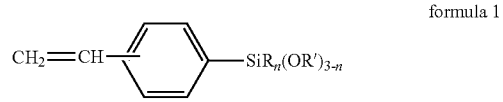

formula 1

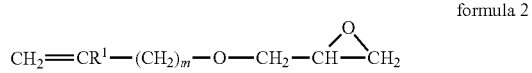

formula 2

In the general formula 1, n represents 0 to 2, and n is more preferably 0; Reach independently represents an alkyl group having 1 to 10 carbon numbers or a derivative of the alkyl group; and R' represents methyl group, ethyl group or propyl group, and R' is more preferably methyl group. In the general formula 2, m is 1 to 3, more preferably 1, and $R^1$ represents hydrogen atom or methyl group, more preferably hydrogen atom.

The alkyl group for R is an alkyl group having, more preferably 1 to 3 carbon numbers, and further preferably 1 carbon number. Specific examples include methyl group, ethyl group, propyl group and the like. Examples of the derivative of the alkyl group include those having, more preferably 1 to 3 carbon numbers, further preferably 1 carbon number, and specific examples include an alkoxy group, an ether group and the like.

In the case when the adhesion-imparting agent contains both the compound represented by the general formula 1 and the compound represented by the general formula 2, the effect of the present invention to improve the adhesion of hard-to-bond materials is more excellent, although the reason therefor is not clear; therefore, it is more preferable to use an allyl glycidyl ether represented by the following formula among the compounds of the general formula 2.

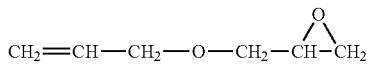

In the case when the adhesion-imparting agent contains both the compound represented by the general formula 1 and the compound represented by the general formula 2, an adhesion-imparting agent other than the compounds of the general formula 1 and the general formula 2 may be added to the adhesion-imparting agent. Examples of the other adhesion-imparting agent include, but are not limited to, silane-based coupling agents having epoxy group, vinyl group, acryl group or methacryl group and a hydrolyzable silane group in combination, polyorganosiloxanes having phenyl group and a hydrolyzable silyl group, and/or polyorganosiloxanes having epoxy group and a hydrolyzable silyl group, and the like. Specific examples of the silane-based coupling agents include, but are not limited to, allyltrimethoxysilane, vinyltrimethoxysilane, 3-glycidoxypropyltrimethoxysilane, 3-methacryloxypropyltrimethoxysilane, 3-acryloxypropyltrimethoxysilane, 3-chloropropyltrimethoxysilane and the like.

Specific examples of the polyorganosiloxanes having phenyl group and a hydrolyzable silyl group include, but are not limited to, KR-217, KR-213, KR-9218, KR-510, X-40-9227 and X-40-9247 manufactured by Shin-Etsu Chemical Co., Ltd., and 3037 INTERMEDIATE and 3074 INTERMEDIATE manufactured by Dow Corning Toray Co., Ltd. Specific examples of the polyorganosiloxane having epoxy group and a hydrolyzable silyl group include, but are not limited to, X-41-1053 and X-41-1056 manufactured by Shin-Etsu Chemical Co., Ltd. The above-mentioned epoxy group includes aliphatic ethylene oxides, and cyclic aliphatic ethylene oxides, which are alicyclic epoxy groups.

It is preferable that the component (B) is added with 1 to 20 parts by mass, more preferably with 1 to 9 parts by mass, with respect to 100 parts by mass of the component (A). Also in the case when the curable resin composition of the present invention contains an adhesion-imparting agent other than the component (B), it is preferable that the sum of the component (B) and the other adhesion-imparting agent is within the above-mentioned addition amount. When the adhesion-imparting agent is 1 part by mass or more, the adhesion to hard-to-bond materials is certainly improved, whereas when the adhesion-imparting agent is 20 parts by mass or less, a large amount of the crosslinking agent of the component (A) reacts with the component (B), whereby uncuring of the curable resin composition can be prevented.

The production of the curable resin composition of the present invention is not especially limited, and it can be performed by mixing the component (A) and component (B), and an additive as necessary, and stirring until the mixture is homogeneous. For example, the materials can be sequentially introduced into a stirrer, and mixing under stirring can be performed for about 10 minutes to 3 hours at every addition.

[Adhesive and Sealant]

The curable resin composition of the present invention can be used for adhesion use, sealing use and encapsulation use in the fields of vehicle installation, electric and electronics, and the like. The curable resin composition of the present invention is preferable as an adhesive. Accordingly, the present invention also provides an adhesive using the above-mentioned curable resin composition according to the present invention. The adhesive refers to all materials that are used for simply bonding two objects. The present invention also provides a sealant using the above-mentioned curable resin composition according to the present invention. The sealant includes all agents that are used for exerting a function to prevent the circulation and leakage of gases and liquids in mechanical equipments, piping and the like. The adhesive bonds at least a part of a bonded surface of an adherend, whereas the sealant fixes the entirety of a bonded surface of an adherend so that a gas or a liquid would not flow out or leak. In order to use the curable resin composition of the present invention as an adhesive or a sealant, the curable resin composition can be used by mixing with an additive depending on the needs of the adhesive or the sealant.

For example, additives mentioned below can be used in the curable resin composition of the present invention to the extent that the properties of the present invention are not lost. Specifically, additives including colorants such as pigments and dyes, inorganic fillers such as metal powders, calcium carbonate, talc, silica, amorphous silica, alumina and aluminum hydroxide, flame retarders, organic fillers, diluents, plasticizers, antioxidants, defoaming agents, coupling agents, leveling agents and rheology controlling agents may be added by suitable amounts. By adding these, a composition that is excellent in resin strength, adhesive strength, workability, storage property and the like, and a cured product thereof can be obtained. Among these, plasticizers for imparting flexibility to a cured product, and fillers for imparting thixotropy and for improving the toughness of a cured product can be preferably used. The content of the additive differs depending on the intended use of the curable resin composition and the kind of the additive, and can be suitably selected.

As the adherends to which the adhesive or the sealant of the present invention can be applied, the adhesive or sealant can also be applied to hard-to-bond materials that are materials being difficult to be adhered such as polyphenylenesulfide (PPS), polypropylene (PP), polyethylene (PE) and stainless steel (SUS). The adhesive or the sealant can also be applied to materials other than the hard-to-bond materials, and can be used in any materials that are not affected by the heating in curing.

The method for using the adhesive or sealant of the present invention is not especially limited, and adhesion can be performed by applying or dropwise adding the curable resin composition so as to cover the entirety of one or both adhesive surface(s) of adherends, bonding the adherends together, and heating the adherends to thereby cure the resin composition. The application method is not especially limited, and methods such as brush coating, air spray coating, electrostatic coating, immersion coating, dip coating, spin coating and curtain coating are used. Alternatively, the primer composition may be simply added dropwise to the adhesive surface. The curing temperature is from 80 to 160°

C., preferably from 100 to 150° C., and the curing time is preferably from 3 to 90 minutes with considering for workability.

[Primer Composition]

The details of the invention of the primer composition, which is the second embodiment of the present invention, will be explained below. The primer composition of the present invention is a primer composition for a thermosetting resin composition, comprising:

component (B), being an adhesion-imparting agent consisting of a compound represented by the following general formula 1, or, an adhesion-imparting agent comprising a compound represented by the following general formula 1 and a compound represented by the following general formula 2:

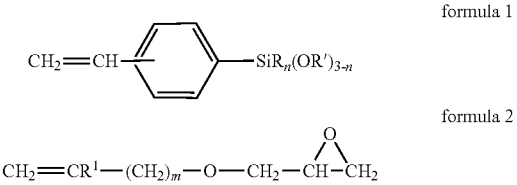

wherein in the general formula 1, n represents 0 to 2, R each independently represents an alkyl group having 1 to 10 carbon numbers or a derivative of the alkyl group, R' represents methyl group, ethyl group or propyl group, and in the general formula 2, m represents 1 to 3, and $R^1$ represents hydrogen atom or methyl group;

component (C), being a catalyst; and component (D), being a curable film-forming composition.

The primer composition as referred to in the present invention is a composition that has a function to aid the self-adhesion capability of an adhesive. In using the primer composition, a surface of an adherend is treated with the primer composition in advance, and bonding is performed by an adhesive. The primer composition may be applied to only one surface of objects to be adhered, or may be applied to both surfaces. The primer composition in the present invention is a primer composition that is used for improving the tight adhesion or adhesion of the thermosetting resin composition of the above-mentioned component (A) or other thermosetting resin compositions to adherends. The primer composition contains the above-mentioned component (B), the catalyst of the component (C), the curable film-forming composition of the component (D), and the solvent of the component (E) as necessary. The primer composition forms a film by heating or moisture. The primer composition of the present invention improves the adhesion to polyphenylenesulfide (PPS), polypropylene (PP), polyethylene (PE) and stainless steel (SUS), which correspond to hard-to-bond materials, by using in advance of the application of the thermosetting resin composition. Especially, the effect of improving adhesion is exerted even the curable resin composition has a structure having a low polarity such as a polyisobutylene skeleton.

The adhesion-imparting agent of the component (B) used in the primer composition of the present invention shows a higher effect of improving the adhesion of the thermosetting resin composition to the hard-to-bond material in the case when the adhesion-imparting agent contains both the compound represented by the general formula 1 and the compound represented by the general formula 2, and thus is preferable. A more preferable compound among the compounds represented by the general formula 2 is allyl glycidyl ether since it has a higher effect of improving adhesion. In the case when the adhesion-imparting agent of the component (B) contains both the compound represented by the general formula 1 and the compound represented by the general formula 2, the adhesion-imparting agent may contain an adhesion-imparting agent other than the general formulae 1 and 2. Meanwhile, since the component (B) of the present invention is similar to the component (B) of the curable resin composition of the above-mentioned first embodiment, a detailed explanation will be omitted.

For the component (C) that can be used in the primer composition of the present invention, i.e., the catalyst, the same as those for the catalyst used in the above-mentioned component (A) can be used. Especially, the catalyst is not limited as long as it is a metal catalyst that is used for an addition reaction of an organopolysiloxane having vinyl group added to silicon and an organopolysiloxane having hydrogen added to silicon. Especially preferable components (C) are platinum-based and/or rhodium-based catalysts in view of prices and many kinds. Specific examples include, but are not limited to, zerovalent platinum complexes such as divinyltetramethyldisiloxane-platinum complex and tetravinyltetramethyltetracyclosiloxane-platinum complex, bivalent platinum complexes such as dichlorobis-triphenylphosphine-palladium complex, and tetravalent platinum complexes such as platinum hydrochloride. Specific examples of the rhodium-based catalyst include, but are not limited to, monovalent rhodium complexes such as chlorotristriphenylphosphite-rhodium complex, bivalent rhodium complexes such as tetrakisacetate dirhodium complex, and trivalent rhodium complexes such as trisacetylacetonato-rhodium complex. Alternatively, two or more kinds of catalysts may be mixed and used as the component (C).

The component (D) that can be used in the present invention is a curable film-forming composition. The curable film-forming composition is used for forming a coating film of the primer on a surface of an adherend by heat curing and/or moisture curing. Especially, a curable film-forming composition containing a main agent for film formation and a catalyst for film formation to cure the main agent is preferable.

Specific examples of the main agent for film formation contained in the component (D) are preferably silicic acid salts (silicates), more preferably tetraalkoxysilanes. Specific examples include, but are not limited to, tetramethoxysilane, tetraethoxysilane (ethyl silicate), tetra-n-butoxysilane, tetraisopropoxysilane and the like. Especially preferably, tetraethoxysilane, which is inexpensive and stably produced, is preferable.

Specific examples of the catalyst for film formation contained in the component (D) include organic metal complexes of titanium and/or zirconium, which have catalystic activity in dehydration and dealcoholization condensation reactions. Specific examples of the organic titanium complexes include, but are not limited to, alkoxide-based titanium complexes such as titanium tetraisopropoxide, titanium tetra-normal-butoxide (titanium tetra-n-butoxide), titanium butoxide dimer, titanium tetra-2-ethylhexoxide, chelate-based titanium complexes such as titanium diisopropoxybis(acetyl acetonate), titanium tetraacetyl acetonate, titaniumdioctyloxy bis(octylene glycol) and titanium diisopropoxybis(ethyl acetoacetate), and acylate-based titanium complexes such as polyhydroxytitanium stearate. Specific examples of the organic zirconium complexes include, but are not limited to, alkoxide-based zirconium complexes such as zirconium tetra-normal-propoxide and zirconium tetra-normal-butoxide, chelate-based zirconium complexes such as zirconium tetraacetyl acetonate, zirconium tributoxymonoacetyl acetonate, zirconium monobutoxyacetyl acetonate bis(ethyl acetoacetate), zirconium dibutoxybis(ethyl acetoacetate) and zirconium tetraacetyl acetonate. Among these, organic titanium complexes are preferable, alkoxide-based titanium complexes are more preferable, and titanium tetra-normal-butoxide is especially preferable, since they are especially suitable for dealcoholization condensation reactions.

Among the above-mentioned embodiments, an embodiment in which the primer composition of the present invention contains silicate and an organic titanium complex as the component (D) is especially preferable.

For the primer composition of the present invention, an exemplary embodiment that contains a solvent as component (E) besides the above-mentioned components (B) to (D) is more preferable. This is because the viscosity can be adjusted depending on adherends and conditions for application, and a uniform coating can be obtained upon application. As the solvent of the component (E) that can be used in the present invention, any solvent that is compatible with the components (B) to (D) can be used. Preferably, a solvent having low water absorbability is suitable, and examples of such solvent include solvents having low polarity. When the solvent has water absorbability, water mixes in the primer composition to decrease the activity. Specific examples include, but are not limited to, hexane, cyclohexane, toluene, xylene, methylcyclohexane, ethylcyclohexane and the like. Among these, ethylcyclohexane is especially preferable in view of compatibility.

The content of the component (C) in the primer composition is preferably such that from 10 to 200 parts by mass is added, with respect to 100 parts by mass of the component (B) in the case of the component (B) alone, or to 100 parts by mass of the sum of the component (B) and another adhesion-imparting agent in the case when another adhesion-imparting agent is contained, but the content varies depending on the concentration. The content is more preferably from 30 to 150 parts by mass, further preferably from 40 to 120 parts by mass. When the component (C) is 10 parts by mass or more, the adhesion with the curable resin composition is higher, whereas when the content is 200 parts by mass or less, it is preferable since the storage stability of the primer composition is higher. The component (D) is added by preferably 50 to 1,000 parts by mass, more preferably from 400 to 800 parts by mass, further preferably from 500 to 700 parts by mass with respect to 100 parts by mass of the component (B). When the component (D) is 50 parts by mass or more, a film formation is performed more certainly and the adhesion is stabilized, whereas when the component (D) is 1,000 parts by mass or more, the gelation of the primer composition can be prevented. The components are diluted with the component (E) by 2- to 10-fold parts by mass, more preferably 4- to 7-fold with respect to the sum of the parts by mass of the components (B) to (D). When the dilution is two or more fold, a too dense concentration of the primer composition can be prevented, and the gelation of the primer composition can also be prevented. On the other hand, when the dilution is 10 fold or less, a film formation can be performed more certainly.

The production of the primer composition is not especially limited, and the above-mentioned components (B) to (D), and the component (E) and the additive as necessary are stirred by a stirrer or the like for 1 to 10 minutes until the mixture is homogeneous. The respective materials may be added at once, or may be added sequentially.

The primer composition can be used in combination with the thermosetting resin composition as the above-mentioned component (A). In the use, the primer composition is firstly applied onto one or two adherend(s), and film formation is performed at 25 to 120° C. for 1 to 60 minutes. Secondly, the two adherends are bonded together with the thermosetting resin composition, and the thermosetting resin composition is then cured. The primer composition can also be cured by moisture, but heating is preferable since the film stabilizes. The component (A) is preferably such that the main agent has, preferably at least one kind selected from a dimethylsiloxane skeleton, a polyisobutylene skeleton, a polyisoprene skeleton, a polybutadiene skeleton, and hydrogenated products thereof, more preferably a polyisobutylene skeleton. Especially, in the case when the adherends are hard-to-bond materials, i.e., polyphenylenesulfide (PPS), polypropylene (PP), polyethylene (PE), stainless steel (SUS) or the like, the adhesion force is more stable by film formation with the primer composition. The primer composition of present invention is also effective for thermosetting resin compositions other than the component (A) exemplified as above. Also in such case, it can be to apply the primer composition to adherends, perform film formation, and sandwich the thermosetting resin composition between the adherends, and cure the thermosetting resin composition in a similar manner to that mentioned above.

The primer composition of the present invention can be used for adhesion use, sealing use and encapsulation use in the fields of vehicle installation, electric and electronics, and the like. Depending on those intended uses, additives can be used in the primer composition to the extent that the properties of the present invention are not lost. As the additives, similar additives to the above-mentioned additives that can be used in the curable resin composition of the present invention can be used.

The following additives can be used in the primer composition of the present invention to the extent that the properties of the present invention are not lost. Namely, colorants such as pigments and dyes, inorganic fillers such as metal powders, calcium carbonate, talc, silica, amorphous silica, alumina and aluminum hydroxide, flame retarders, organic fillers, diluents, plasticizers, antioxidants, defoaming agents, coupling agents, leveling agents and rheology controlling agents may be added by suitable amounts. A composition that is excellent in resin strength, adhesive strength, workability, storage property and the like, and a cured product thereof can be obtained in the case when the primer composition is used together with a thermosetting resin. It is especially preferable to use fillers such as amorphous silica for controlling thixotropy, and color powders for confirming application, and the like in the primer composition. The content of the additive differs depending on the subject of the primer composition and the kind of the additive, and can be suitably selected.

As the adherends to which the primer composition of the present invention can be applied, the primer composition can be applied to similar materials to the above-mentioned adherends for the curable resin composition of the present invention. The primer composition can be preferably applied to either hard-to-bond materials such as polyphenylenesulfide (PPS), polypropylene (PP), polyethylene (PE) and stainless steel (SUS), which are hard-to-bond materials, or to other materials.

[Adhesion Method and Sealing Method]

Another exemplary embodiment of the present invention is a method for adhesion comprising the steps of: applying the primer composition the present invention onto one or both of adherends, applying the thermosetting resin composition, bonding the two adherends together, and heating the adherends to cure.

In the adhesion method, two objects are fixed by adhering at least a part of the joined surfaces of the adherends. Therefore, the adhesion method can also be used for sealing (encapsulating) adherends. For example, adherends can be sealed so as to function to prevent circulation or leakage of gases and liquids in mechanical equipment, pipings and the like. In the sealing method, the entirety of the adhesive surfaces of the adherends is adhered so as to prevent the circulation of gases or liquids. Therefore, the present invention also provides a sealing method using the above-mentioned curable resin composition of the present invention.

The method for application is not especially limited, and methods such as brush coating, air spray coating, electrostatic coating, immersion coating, dip coating, spin coating and curtain coating are used. Alternative, the primer composition may be simply added dropwise onto the adhesive surface. For curing the primer composition, film formation can be performed at from 25 to 120° C. for 1 to 60 minutes. The primer composition can also be cured by moisture, but heating is preferable because the film stabilizes.

As the method for applying the thermosetting resin composition, similar methods to those for the primer composition can be used without a limitation. The curing temperature after the application of the thermosetting resin composition is from 80 to 160° C., preferably from 100 to 150° C. with considering for workability, and the curing time is preferably from 3 to 90 minutes.

EXAMPLES

The present invention will further be explained below in detail with referring to Examples, but the present invention is not construed to be limited to only these Examples.

Examples 1 to 9, Comparative Examples 1 to 13

In order to prepare curable resin compositions and primer compositions, the following components were prepared.
Component (A): Thermosetting Resin Composition
Main agent: an oligomer having vinyl group and polyisobutylene skeleton (polyisobutylene which terminals were functionalized by two vinyl groups, Epion EP-400A manufactured by Kaneka Corporation)
Crosslinking agent: a compound having hydrogensiloxane group (poly (dimethylsiloxane-co-methylhydrosiloxane) CR-300, manufactured by Kaneka Corporation)
Catalyst: isopropyl alcohol solution of platinum divinyltetramethyldisiloxane complex (concentration: 3% by mass) (Pt-VTS-3.0IPA manufactured by Umicore Precious Metals Japan) (this corresponds to the following component (C))
Suppressing agent: diethyl maleate (reagent) Component (B): an adhesion-imparting agent represented by the general formula 1
Adhesion-imparting agent 1: p-styryltrimethoxysilane (KBM-1403 manufactured by Shin-Etsu Chemical Co., Ltd.) Component (B'): an adhesion-imparting agent other than the component (B)
Adhesion-imparting agent 2: allyl glycidyl ether (Neoallyl G manufactured by DAISO Co., Ltd.)
Adhesion-imparting agent 3: allyltrimethoxysilane (Z-6825 manufactured by Dow Corning Toray Co., Ltd.)
Adhesion-imparting agent 4: a methyl/epoxy-based silicone containing methoxy group (viscosity (25° C.): 50 mm$^2$/s) (X-41-1056 manufactured by Shin-Etsu Chemical Co., Ltd.)
Adhesion-imparting agent 5: pentaerythritol triallyl ether (Neoallyl P-30 manufactured by DAISO Co., Ltd.)
Adhesion-imparting agent 6: 3-glycidoxypropyltrimethoxysilane (KBM-403 manufactured by Shin-Etsu Chemical Co., Ltd.)
Component (C): a Catalyst
Catalyst: isopropyl alcohol solution of platinum divinyltetramethyldisiloxane complex (concentration: 3% by mass) (Pt-VTS-3.0IPA manufactured by Umicore Precious Metals Japan)
Component (D): a Curable Film-Forming Composition
Main agent for film formation: ethyl silicate (Ethyl Silicate #40 manufactured by Colcoat Co., Ltd.)
Catalyst for film formation: titanium tetra-n-butoxide (reagent)
Component (E): a Solvent
Solvent: ethylcyclohexane for industrial use (ethylcyclohexane manufactured by Godo Solvent K.K.)
Others: Additives
Additive 1: poly alpha-olefin (viscosity (40° C.): 19 mm$^2$/s) (SpectraSyn4 manufactured by ExxonMobil) (plasticizer)
Additive 2: silica powder (AEROSIL R-972 manufactured by Nippon Aerosil Co., Ltd.) (filler)

In the method for the production of the curable resin composition, the above-mentioned component (A) and the additive were weighed and stirred by a stirrer for 1 hour. Secondly, the component (B) or (B') was weighed and added to it, and stirred for further 1 hour. The specific adjusted amounts followed Table 1. All of the numerical values in the Tables were described by parts by mass. The equivalent amounts of the compound having hydrogensiloxane group (the crosslinking agent in the component (A)) and the component (B) or (B') were calculated with respect to 100 parts by mass of the oligomer having vinyl group and isobutylene skeleton, then the addition amounts were determined. The detailed preparation amounts followed Table 1. All of the numerical values in the Tables were represented by parts by mass.

TABLE 1

| Component | Raw materials | Example 1 | Example 2 | Example 3 | Example 4 | Example 5 | Example 6 | Comparative Example 1 | Comparative Example 2 |
|---|---|---|---|---|---|---|---|---|---|
| Component (A) | Main agent | 100 | 100 | 100 | 100 | 100 | 100 | 100 | 100 |
| | Crosslinking agent | 12 | 12 | 12 | 12 | 12 | 12 | 4 | 12 |
| | Catalyst | 0.3 | 0.3 | 0.3 | 0.3 | 0.3 | 0.3 | 0.1 | 0.3 |
| | Suppressing agent | 0.2 | 0.2 | 0.2 | 0.2 | 0.2 | 0.2 | 0.1 | 0.2 |

TABLE 1-continued

| Component | Raw materials | | | | | | | | |
|---|---|---|---|---|---|---|---|---|---|
| Component (B) | Adhesion-imparting agent 1 | 7.8 | 3.9 | 2.6 | 2.6 | 2.6 | 1.9 | | |
| Component (B') | Adhesion-imparting agent 2 | | 1.9 | 1.3 | 1.3 | 1.3 | 1.0 | | 3.9 |
| | Adhesion-imparting agent 3 | | | 1.9 | | | 2.3 | | |
| | Adhesion-imparting agent 4 | | | | 1.3 | | 1.0 | | |
| | Adhesion-imparting agent 5 | | | | | | | | |
| | Adhesion-imparting agent 6 | | | | | 1.8 | | | |
| Others | Additive 1 | 30 | 30 | 30 | 30 | 30 | 30 | 30 | 30 |
| | Additive 2 | 26 | 26 | 26 | 26 | 26 | 26 | 26 | 26 |
| | Total | 175.8 | 173.9 | 173.8 | 173.2 | 173.7 | 174.2 | 160.0 | 171.9 |

| Component | Raw materials | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|
| Component (A) | Main agent | 100 | 100 | 100 | 100 | 100 | 100 | 100 |
| | Crosslinking agent | 12 | 12 | 12 | 12 | 12 | 12 | 12 |
| | Catalyst | 0.3 | 0.3 | 0.3 | 0.3 | 0.3 | 0.3 | 0.3 |
| | Suppressing agent | 0.2 | 0.2 | 0.2 | 0.2 | 0.2 | 0.2 | 0.2 |
| Component (B) | Adhesion-imparting agent 1 | | | | 3.9 | 3.9 | | |
| Component (B') | Adhesion-imparting agent 2 | | | | | | 1.9 | 1.9 |
| | Adhesion-imparting agent 3 | 5.6 | | | 2.8 | | 2.8 | |
| | Adhesion-imparting agent 4 | | 3.9 | | | 1.9 | | 1.9 |
| | Adhesion-imparting agent 5 | | | 3.0 | | | | |
| | Adhesion-imparting agent 6 | | | | | | | |
| Others | Additive 1 | 30 | 30 | 30 | 30 | 30 | 30 | 30 |
| | Additive 2 | 26 | 26 | 26 | 26 | 26 | 26 | 26 |
| | Total | 173.6 | 171.9 | 171.0 | 174.7 | 173.9 | 172.8 | 171.9 |

In the method for the production of the primer composition, the components (B), (C), (D) and (E) were stirred by a stirrer for 5 minutes. The detailed preparation amounts followed Table 2. All of the numerical values in the Tables were represented by parts by mass.

TABLE 2

| Component | Raw materials | Example 7 | Example 8 | Example 9 | Comparative Example 10 | Comparative Example 11 | Comparative Example 12 | Comparative Example 13 |
|---|---|---|---|---|---|---|---|---|
| Component (B) | Adhesion-imparting agent 1 | 100 | 50 | 25 | | | | |
| Component (B') | Adhesion-imparting agent 2 | | 50 | 25 | 100 | | | |
| | Adhesion-imparting agent 3 | | | 25 | | 100 | | |
| | Adhesion-imparting agent 4 | | | 25 | | | 100 | |
| | Adhesion-imparting agent 5 | | | | | | | |
| | Adhesion-imparting agent 6 | | | | | | | 100 |
| Component (C) | Catalyst | 100 | 50 | 100 | 100 | 100 | 100 | 100 |
| Component (D) | Main agent for film formation | 100 | 50 | 100 | 100 | 100 | 100 | 100 |
| | Catalyst for film formation | 500 | 250 | 500 | 500 | 500 | 500 | 500 |
| Component (E) | Solvent | 5000 | 2500 | 5000 | 5000 | 5000 | 5000 | 5000 |
| | Total | 5800 | 2950 | 5800 | 5800 | 5800 | 5800 | 5800 |

Longitudinal shear strengths were measured by the following methods for Examples and Comparative Examples. The results thereof were summarized in the following Tables 3 to 5.

[Measurement of Longitudinal Shear Strength 1]

Using the curable resin compositions of Examples 1 to 6 and Comparative Examples 1 to 9 as a curable resin composition, the longitudinal shear strengths were measured. As adherend materials, polyphenylenesulfide (PPS), polypropylene (PP), polyethylene (PE) and stainless steel (SUS) were respectively used. Using adherends each having a size of length 100 mm×width 25 mm×thickness 1 mm, each of the curable resin compositions of Examples 1 to 6 and Comparative Examples 1 to 9 was applied to the adherends so as to give an adhesive surface area of 25 mm×10 mm each, and the adherends were bonded together and fixed by a fixing jig. The curable resin composition was then heat-cured under 130° C. or 100° C. atmospheres for 1 hour. The maximum strength was measured according to JIS K 6850 (1999), and "longitudinal shear strength (MPa)" was calculated from the adhesive surface area. In Tables 3 to 5, the materials of the used adherends were additionally described in brackets as PPS, PP, PE or SUS in the tested items. The cases when the adhesion force was weak and thus a measurement was impossible by using a test piece were deemed as "measurement was impossible". The results of the curable resin compositions cured under an atmosphere of curing temperature of 130° C. for 1 hour were shown in Table 3, and the results of the curable resin compositions cured under an atmosphere of a curing temperature of 100° C. were shown in Table 4. Although there is a difference among the judging criteria of the adherends, 2.0 MPa or more is required for PPS, 1.0 Mpa or more is required for PP, 1.0 Mpa or more is required for PE, and 2.0 MPa or more is required for SUS. In the cases when these adhesive strengths are not satisfied, dropping off the adherend may be caused in the cases of adhesives, or lowering the airtightness may be caused in the cases of sealants.

TABLE 3

| Tested Item | Example 1 | Example 2 | Example 3 | Example 4 | Example 5 | Example 6 | Comparative Example 1 | Comparative Example 2 |
|---|---|---|---|---|---|---|---|---|
| Longitudinal Shear strength (PPS) | 2.0 | 2.5 | 2.4 | 2.3 | 2.3 | 2.4 | Measurement was impossible | 1.5 |
| Longitudinal Shear strength (PP) | 1.0 | 1.1 | 1.5 | 1.1 | 1.0 | 1.4 | Measurement was impossible | 0.3 |
| Longitudinal Shear strength (PE) | 1.6 | 1.4 | 2.0 | 2.3 | 1.8 | 2.2 | Measurement was impossible | 0.6 |
| Longitudinal Shear strength (SUS) | 2.3 | 2.5 | 2.2 | 2.4 | 2.3 | 2.3 | Measurement was impossible | 1.4 |

| Tested Items | Comparative Example 3 | Comparative Example 4 | Comparative Example 5 | Comparative Example 6 | Comparative Example 7 | Comparative Example 8 | Comparative Example 9 |
|---|---|---|---|---|---|---|---|
| Longitudinal Shear strength (PPS) | 0.4 | 0.4 | 1.0 | 1.5 | 1.2 | 1.1 | 1.0 |
| Longitudinal Shear strength (PP) | 0.4 | 0.2 | Measurement was impossible | 1.3 | 0.7 | 0.7 | 0.4 |
| Longitudinal Shear strength (PE) | 0.7 | 1.6 | 0.6 | 1.5 | 1.9 | 0.8 | 1.2 |
| Longitudinal Shear strength (SUS) | 0.5 | 1.4 | 2.1 | 1.5 | 2.0 | 1.0 | 1.5 |

TABLE 4

| Tested Item | Example 1 | Example 6 | Comparative Example 1 | Comparative Example 2 | Comparative Example 3 | Comparative Example 4 |
|---|---|---|---|---|---|---|
| Longitudinal Shear strength (PPS) | 2.2 | 2.4 | Measurement was impossible | 0.9 | 0.5 | 0.5 |
| Longitudinal Shear strength (PP) | 1.0 | 1.0 | Measurement was impossible | 0.2 | 0.3 | 0.1 |
| Longitudinal Shear strength (PE) | 1.2 | 2.1 | Measurement was impossible | 0.6 | 0.3 | 0.5 |

TABLE 4-continued

| Tested Item | Example 1 | Example 6 | Comparative Example 1 | Comparative Example 2 | Comparative Example 3 | Comparative Example 4 |
|---|---|---|---|---|---|---|
| Longitudinal Shear strength (SUS) | 2.2 | 2.3 | Measurement was impossible | 0.8 | 0.4 | 0.9 |

[Measurement of Longitudinal Shear Strength 2]

Using the curable resin composition of Comparative Example 1 as a thermosetting resin composition, and using the primer compositions of Examples 7 to 9 and Comparative Examples 10 to 13 respectively as a primer composition, the shear adhesive strengths were measured. As the adherend materials, the same adherend materials as those in Measurement of Shear Adhesive Strength 1 were used. The primer composition was applied onto an adhesive surface of one of adherends, and heated under a 100° C. atmosphere for 15 minutes in a hot air drying furnace. Thereafter the curable resin composition was applied so as to give an adhesive surface area of 25 mm ×10 mm, and the other adherend was bonded to the one adherend, and the adherends were fixed in a fixing jig. Thereafter, heat curing was performed in 100° C. atmospheres for 1 hour. The maximum strength was measured according to JIS K 6850 (1999), and "longitudinal shear strength (MPa)" was calculated from the adhesive surface area. The materials of the used adherends were additionally described in brackets as PPS, PP, PE or SUS in the tested items. The results were shown in the following Table 5. The evaluation criteria were the same as that in Measurement of Shear Adhesive Strength 1.

TABLE 5

| Tested Item | Example 7 | Example 8 | Example 9 | Comparative Example 10 | Comparative Example 11 | Comparative Example 12 | Comparative Example 13 |
|---|---|---|---|---|---|---|---|
| Longitudinal Shear strength (PPS) | 2.2 | 2.3 | 2.3 | 1.8 | 1.3 | 0.5 | 0.6 |
| Longitudinal Shear strength (PP) | 1.0 | 1.4 | 1.6 | 1.2 | 0.9 | 0.4 | 0.2 |
| Longitudinal Shear strength (PE) | 1.7 | 2.0 | 2.3 | 1.2 | 1.3 | 0.8 | 0.8 |
| Longitudinal Shear strength (SUS) | 2.2 | 2.3 | 2.4 | 1.9 | 1.2 | 1.0 | 1.5 |

The results relating to the curable resin compositions are shown in Tables 3 and 4. As shown in Comparative Examples 2 to 5, 8 and 9 in Table 3, even unspecified adhesion-imparting agents are added to the component (A), a result that satisfies the evaluation criteria cannot be obtained, and thus a sufficient adhesion force is not exerted for a hard-to-bond material. It is necessary to singly add the component (B) as in Example 1. Or, in the cases when other adhesion-imparting agent(s) is/are added together with the component (B), as understood from the comparison with Comparative Examples 6 and 7, when allyl glycidyl ether is added together with the component (B) as in Examples 2 to 6, the evaluation criteria are satisfied, and thus sufficient adhesion forces for hard-to-bond materials can be obtained.

As understood from the comparison of Tables 3 and 4, the adhesive strength is maintained even the temperature is preset to be low.

The results relating to the thermosetting resin compositions and the primer compositions are shown in Table 5. Also when the primer composition was used, in the case when the component (B) was singly added to the primer composition as in Example 7, or in the cases when allyl glycidyl ether was added together with the component (B) as in Examples 8 and 9, the evaluation criteria were satisfied, and thus sufficient adhesion forces for hard-to-bond materials can be obtained.

Industrial Applicability

In recent years, there are many cases in which a material that is difficult to change in properties is used as an adherend in automobiles, electric and electronic devices, electronic parts and the like. The material that is difficult to change in properties is also a hard-to-bond material that is difficult to be adhered from the viewpoint of adhesives. Since hard-to-bond materials will be used in the future so as to prevent the deterioration of products themselves, it is considered that the fields and intended uses to which the present invention can be applied widely range.

The present application is based on Japanese Patent Application No. 2012-114513 filed on May 18, 2012, and the entirety of the disclosure thereof is incorporated herein by reference.

The invention claimed is:
1. A curable resin composition comprising:
component (A), being a thermosetting resin composition containing a polyisobutylene skeleton as a main component, a crosslinking agent, a platinum-based and/or rhodium-based catalyst, and a suppressing agent; and component (B), being an adhesion-imparting agent consisting of a compound represented by the following general formula 1, or, an adhesion-imparting agent comprising the compound represented by the following general formula 1 and a compound represented by the following general formula 2:

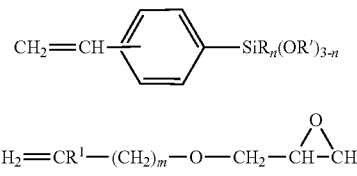
formula 1

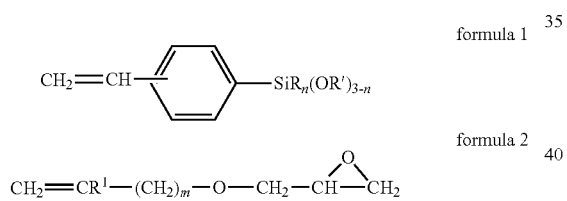
formula 2 wherein in the general formula 1, n represents 0 to 2, R each independently represents an alkyl group having 1 to 10 carbon numbers or a derivative of the alkyl group, R' represents methyl group, ethyl group or propyl group, and in the general formula 2, m represents 1 to 3, and $R^1$ represents hydrogen atom or methyl group.

2. An adhesive using the curable resin composition according to claim 1.

3. A primer composition for a thermosetting resin composition, comprising:
component (B), being an adhesion-imparting agent consisting of a compound represented by the following general formula 1, or, an adhesion-imparting agent comprising the compound represented by the following general formula 1 and a compound represented by the following general formula 2:

formula 1 formula 2 wherein in the general formula 1, n represents 0 to 2, R each independently represents an alkyl group having 1 to 10 carbon numbers or a derivative of the alkyl group, R' represents methyl group, ethyl group or propyl group, and in the general formula 2, m represents 1 to 3, and $R^1$ represents hydrogen atom or methyl group;
component (C), being a platinum-based and/or rhodium-based catalyst; and
component (D), being a curable film-forming composition, and
the primer composition being free of a crosslinking agent containing Si—H group.

4. A primer composition according to claim 3, wherein the component (D) comprises a silicate and an organic titanium complex.

5. A primer composition according to claim 3, further comprising component (E): a solvent.

6. A primer composition according to claim 3, wherein the thermosetting resin composition comprises a main agent having a polyisobutylene skeleton.

7. The primer composition of claim 4, wherein said silicate is selected from the group consisting tetramethoxysilane, tetraethoxysilane (ethyl silicate), tetra-n-butoxysilane, and tetraisopropoxysilane.

8. A primer composition according to claim 3, wherein the primer composition further being free of an epoxy curing agent.

9. A primer composition according to claim 4, wherein said silicate is liquid at 25° C.

10. A primer composition according to claim 3, wherein the component (D) is added in an amount of 50 to 1,000 parts by mass with respect to 100 parts by mass of the component (B).

11. A primer composition according to claim 3, wherein the component (D) is added in an amount of 400 to 800 parts by mass with respect to 100 parts by mass of the component (B).

12. A primer composition according to claim 3, wherein the component (D) is added in an amount of 500 to 700 parts by mass with respect to 100 parts by mass of the component (B).

13. A method for adhesion, comprising the steps of:
applying a primer composition onto one or both of adherends, wherein the primer composition comprises
component (B), being an adhesion-imparting agent consisting of a compound represented by the following general formula 1, or, an adhesion-imparting agent comprising the compound represented by the following general formula 1 and a compound represented by the following general formula 2:

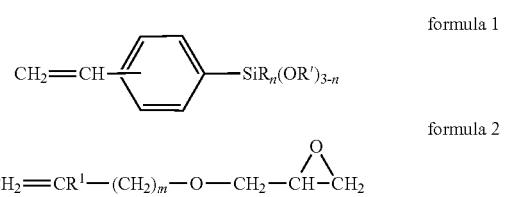
formula 1 formula 2 wherein in the general formula 1, n represents 0 to 2, R each independently represents an alkyl group having 1 to 10 carbon numbers or a derivative of the alkyl group, R' represents methyl group, ethyl group or propyl group, and in the general formula 2, m represents 1 to 3, and $R^1$ represents hydrogen atom or methyl group;
component (C), being a platinum-based and/or rhodium-based catalyst; and
component (D), being a curable film-forming composition comprising silicates and organic titanium complexes, and
applying a thermosetting resin composition, bonding the two adherends together, and heating the adherends to cure the thermosetting resin composition.

* * * * *